United States Patent [19]

McMurtry et al.

[11] Patent Number: 5,583,443
[45] Date of Patent: Dec. 10, 1996

[54] CALIBRATION OF CAPACITANCE PROBE

[75] Inventors: David R. McMurtry, Wotton-Under-Edge; David K. Thomas, Stinchcombe; David C. Bound, Dursley, all of United Kingdom

[73] Assignee: Renishaw PLC, Gloucestershire, United Kingdom

[21] Appl. No.: 481,161

[22] Filed: Jun. 7, 1995

Related U.S. Application Data

[63] Continuation of Ser. No. 198,372, Feb. 18, 1994, abandoned, which is a continuation of Ser. No. 849,432, filed as PCT/GB91/01703, Oct. 2, 1991 published as WO92/06350, Apr. 16, 1992, abandoned.

[30] Foreign Application Priority Data

Oct. 3, 1990 [GB] United Kingdom .................. 9021447

[51] Int. Cl.$^6$ .......................... G01R 27/26; G01R 35/00
[52] U.S. Cl. .......................... 324/601; 324/662; 324/690; 324/758
[58] Field of Search .................... 324/149, 601, 324/662, 663, 684, 690, 754, 758

[56] References Cited

U.S. PATENT DOCUMENTS

| | | |
|---|---|---|
| 3,400,331 | 9/1968 | Harris et al. . |
| 3,986,109 | 10/1976 | Poduje . |
| 4,067,225 | 1/1978 | Dorman et al. .............. 324/662 X |
| 4,130,796 | 12/1978 | Shum ......................... 324/601 |
| 4,153,998 | 5/1979 | McMurtry . |
| 4,190,797 | 2/1980 | Lecklidek et al. .............. 324/662 |
| 4,498,043 | 2/1985 | Heathcote et al. ............. 324/662 |
| 4,509,266 | 4/1985 | Cusack ..................... 340/686 X |
| 4,539,835 | 9/1985 | Shambroom et al. ......... 324/662 X |
| 4,814,691 | 3/1989 | Garbini et al. . |
| 4,816,744 | 3/1989 | Papurt et al. ................. 324/684 |
| 4,908,574 | 3/1990 | Rhoades et al. ............ 324/690 X |
| 5,021,740 | 6/1991 | Sarr et al. ................. 324/662 X |
| 5,189,377 | 2/1993 | Rhoades et al. .............. 324/662 |
| 5,315,259 | 5/1994 | Jostlein ..................... 324/690 |

FOREIGN PATENT DOCUMENTS

| | | |
|---|---|---|
| 0004757 | 10/1979 | European Pat. Off. . |
| 0078027 | 5/1983 | European Pat. Off. . |
| 0221638 | 5/1987 | European Pat. Off. . |
| 0243766 | 11/1991 | European Pat. Off. . |
| 2495308 | 6/1982 | France . |

OTHER PUBLICATIONS

W. K. Clothier et al.; The Guarded Sphere as a Gauging Electrode in Length Metrology; 1967, vol. 44, J. Sci. Instrum. (month unavailable).
C. D. Bugg et al.; Correcting Scanning Capacitance Microscope Images for the Effect of Surface Gradient; pp. 239–244, vol. 12, Oct. 1990, Precision Engineering.
Wentworth Labs, Microscan, Model SCP7000 Non Contact Surface Profiler for Wet Printed Resistors, Pastes and Ceramic Substrates (date unavailable).
Abbe et al., "A Brief Report on Non–Contact Gauging", Jun. 1975, pp. 16–20.
Knowles, "Capacitance Gauging: Survey of Recent Advances", Oct. 1988, pp. 14–22.

*Primary Examiner*—Kenneth A. Wieder
*Assistant Examiner*—Glenn W. Brown
*Attorney, Agent, or Firm*—Oliff & Berridge

[57] ABSTRACT

A capacitance probe is used by a coordinate measuring machine or machine tool to determine distances from the probe to the workpiece surface at various points over the surface. The probe is calibrated by moving it along a line, which is skewed to the surface. During this movement, a plurality of values of the capacitance and the corresponding values of the actual distance moved along the line are recorded. A datum value for the movement along the skewed line is also determined, which corresponds to a position at which the probe would touch the surface. The probe is calibrated without needing separate independent measurements of the distance from the probe to the surface. The workpiece surface is scanned using the thus-calibrate probe, in which different calibration values are used at different points on the surface, in order to account for the local shape of the surface.

38 Claims, 3 Drawing Sheets

CALIBRATION OF CAPACITANCE PROBE

This is a Continuation of application Ser. No. 08/198,372 filed Feb. 18, 1994 now abandoned, which in turn is a continuation of application Ser. No. 07/849,432, filed as PCT/GB91/01703, Oct. 2, 1991 published as WO92/06350, Apr. 16, 1992, now abandoned.

BACKGROUND OF THE INVENTION

This invention relates to capacitance probes for measuring distance, for example for scanning the contour or topography of the surface of a workpiece, or determining surface roughness. More particularly, it relates to methods of calibrating and using such probes.

Known capacitance probes with which the methods of the present invention may be used may consist of an electrode in the form of a sphere or plate. This electrode is brought into proximity with the surface to be measured, and the capacitance between the electrode and the workpiece surface is measured. This gives an indication of the distance between the electrode and the surface, or of the surface roughness. Alternatively, our concurrently filed, co-pending International Patent Application Number PCT/GB91/01703 (Applicants Reference 176WO), which claims priority from UK Patent Application No. 9021447.9, discloses capacitance probes having two parallel plates, oriented edge-on to the surface to be measured. The presence of a workpiece (conductive or non-conductive) affects the fringe-field adjacent the edges of the plates and thus the capacitance between the plates. Again, the distance to the surface or the surface roughness can be determined from measurements of the capacitance.

SUMMARY OF THE INVENTION

The present invention provides a method of calibrating a capacitance probe for measuring distance between the probe and a surface, the method comprising moving the probe towards and/or away from the surface, characterised by the step of determining a datum position corresponding to the position at which the probe touches the surface.

BRIEF DESCRIPTION OF THE DRAWINGS

Various methods of calibration and use of capacitance probes, according to the invention, will now be described by way of example with reference to the accompanying drawings, wherein.

DESCRIPTION OF PREFERRED EMBODIMENTS

Figure 1:
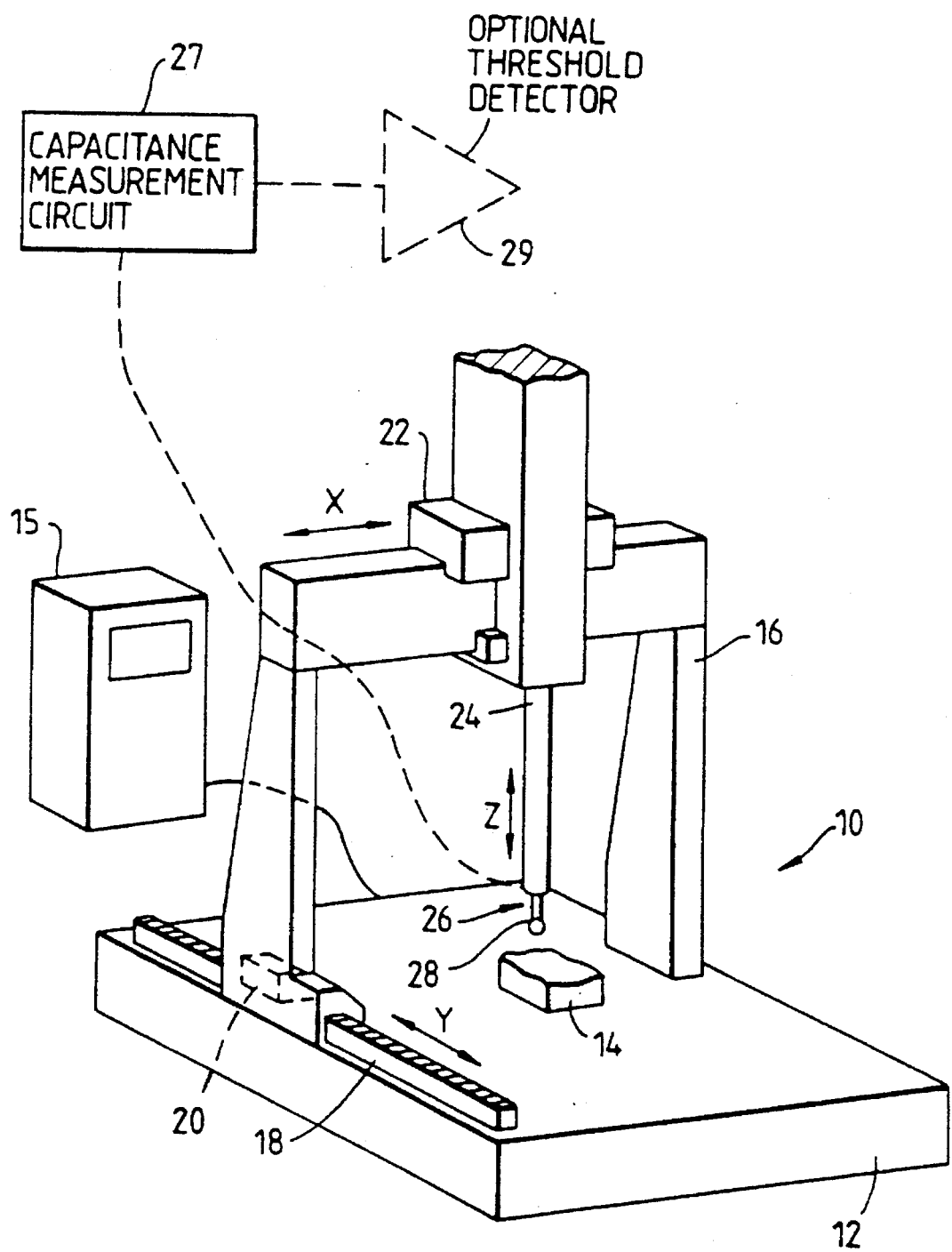
FIG. 1 shows a co-ordinate measuring machine (CMM)

FIG. 1 shows a co-ordinate measuring machine (CMM) 10 comprising a bed or table 12 on which a workpiece 14 may be laid for measurement. A bridge 16 is moveable in the Y direction with respect to the table 12, its position being measured by a scale 18 on the table 12 and a read-head 20 on the bridge 16. A carriage 22 is moveable in the X direction on the bridge 16, its position again being measured by a scale and read-head (not shown). Likewise, a moveable arm or quill 24 is moveable in the Z direction on the carriage 22, and its position is again measured by a scale and read-head (not shown). The end of the quill 24 carries a capacitance probe 26, which in this example comprises a spherical electrode 28. It will be understood that the probe 26 is moveable in all three orthogonal directions X, Y, Z relative to the workpiece 14, and its X, Y, X co-ordinates at any given time are measured by the respective scales and read-heads. Of course, other designs of co-ordinate measuring machine are known than the above-described bridge type, and may well be used in the present invention. As is well known, the CMM 10 is preferably moved in the X, Y, Z directions by motors (not shown) under the control of a suitably programmed computer 15, which may also include an electronic interface circuit 27 for the probe 26. The invention may be used on machine tools as well as on CMMs.

In use, to scan the contour or profile of the surface of the workpiece 14 and obtain data concerning its topography, the probe 26 is moved in three dimensions across the surface of the workpiece, not in contact with it. The capacitance between the sphere 28 and the workpiece is measured by the circuit 27 (assuming the workpiece 14 to be of a conductive material, e.g. metal), giving an output relating to the distance between the sphere 28 and the workpiece surface. This output is added to the co-ordinates read from the scales of the CMM, in well known manner, to give the co-ordinates of the point on the workpiece surface at any given instant. Data concerning the topography of the workpiece surface is acquired by repeating such measurements at many points on the workpiece surface as the surface is scanned, in a manner well known when other types of probe are used on CMM's.

Figure 2:
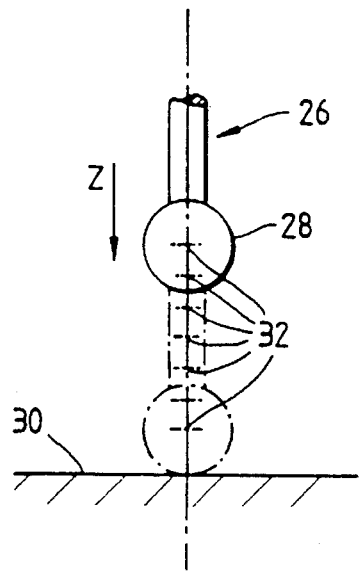
FIG. 2 shows part of a probe and a workpiece.
Figure 3:
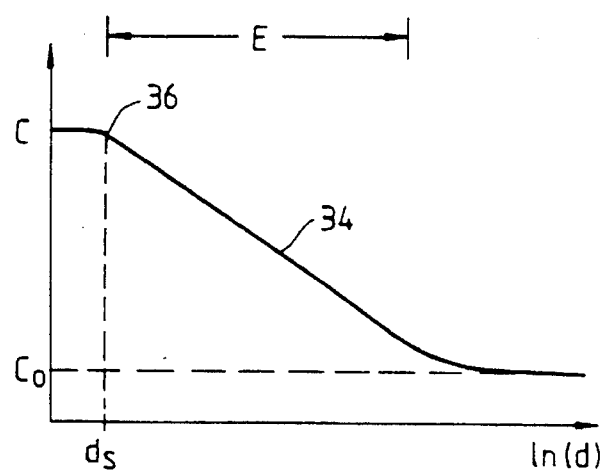
FIGS. 3 and 4 are graphs of capacitance against distance.

To give accurate readings, the capacitance probe 26 must be calibrated. FIG. 2 illustrates a simple method of doing this. The probe 26 is gradually moved towards the surface 30 the workpiece, in a direction normal to the surface (here, the Z direction) until the sphere 28 is touching the surface 30 as shown in broken lines. During this travel, a plurality of position readings are taken from the CMM's scales, indicated in FIG. 2 by points 32 which each correspond to the centre of the sphere 28 at one of the measured positions. At each of these positions 32, a capacitance reading is taken from the probe (i.e., the electronic circuitry 27 connected to the sphere 28 is interrogated to determine the capacitance between the sphere and earth). FIG. 3 shows a graph of the typical results of such measurements. In FIG. 3, the capacitance C is plotted against the natural logarithm of the distance d of the probe 26 from the workpiece 30. As can be seen in FIG. 3, the resulting curve 34 has a region E in which the capacitance C varies exponentially with the distance d, resulting in a straight line in the logarithmic graph of FIG. 3. At a point 36, the sphere 28 touches the surface 30, resulting in a sharp discontinuity in the curve of the measured value of the capacitance. The value of d at this point has been labelled $d_o$. It corresponds to zero spacing between the sphere 28 and the surface 30, though of course the CMM scales are unlikely to be zero at this point. In FIG. 3, the capacitance is shown as becoming approximately constant at the point $d_s$, which is the effect observed by the circuit 27 when a short circuit occurs between the sphere 28 and the surface 30. The actual value of capacitance at $d_s$ is theoretically infinity (N.B. this cannot be represented with a logarithmic scale). However, the important phenomenon to be observed is the sharp discontinuity in the capacitance graph representing contact with a surface.

Figure 5:
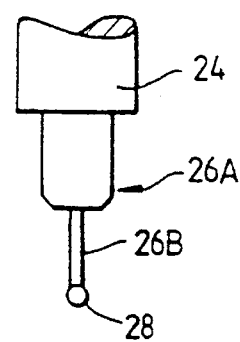
FIG. 5 shows a probe.

To allow for continued movement of the quill 24 despite the fact that the sphere 28 can move no further, it is preferable that the probe is in the form of the probe 26A shown in FIG. 5, having a deflectable stylus 26B at the tip of which is located the sphere 28. The stylus 26B is deflectably located in a positive rest position within the probe 26A, for example in the manner described in U.S. Pat. 4,153,998.

At higher values of the distance d, the curve 34 flattens out as shown in FIG. 3 and tends to a limiting value $C_0$, namely the free space value of the capacitance of the sphere 28.

In general terms, in the exponential region E the capacitance C varies with the distance d in accordance with the equation $$C = \frac{C_0}{k_1} \ln\left(\frac{d_0}{d}\right) \quad (1)$$

where $C_0$ is the free space value of the capacitance and $d_0$ and $k_1$ are constants. This equation assumes that $d_s$ is zero, i.e. that the value of d is given in terms of distance from the workpiece surface. Thus, one aspect of the invention relates to obtaining a datum value for $d_s$, to which other measurements of d can be related by subtraction. Since this corresponds to the point at which the sphere 28 contacts the surface 30, there are several ways in which this can be obtained.

In the case of a conductive workpiece surface 30, the instant of the electrical contact between the sphere 28 and the surface 30 can easily be detected electronically by a detector forming part of the capacitance measuring electronics 27. This feeds a trigger signal to the CMM computer to take a reading of the instantaneous values of the X, Y, Z co-ordinates, and also to brake the movement of the machine to prevent collision damage.

Figure 4:
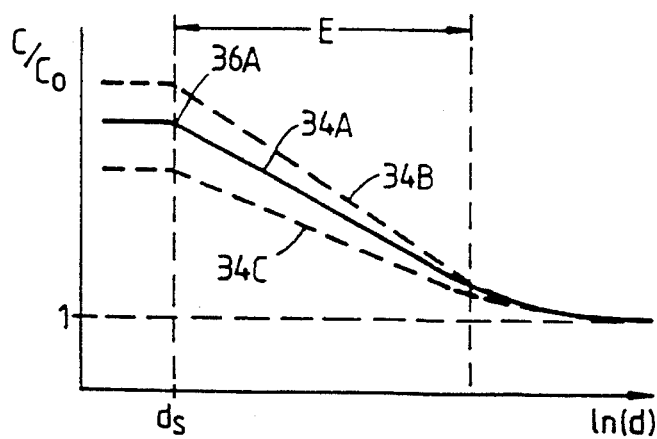

Alternatively, FIG. 4 shows the curve 34A obtained when there is no electrical contact when the sphere 28 and surface 30 mechanically contact each other. This may occur, for example, if one or both surfaces has an insulating (dielectric) layer on its surface; or if the workpiece is itself made of a dielectric material as discussed below. As can be seen in FIG. 4, there is again a sharp discontinuity in the curve at the value $d_s$, at the point of contact 36A. Unlike in FIG. 3, the value of capacitance is not infinite at point $d_s$ and the graph of FIG. 4 is thus more representative. At values below $d_s$, the curve is a horizontal line, signifying no change in capacitance, since the sphere 28 cannot come any closer to the surface 30. The exact location of the point 36A (indicating the point of contact $d_s$) is best obtained by a computer analysis of the capacitance readings taken at various points 32. It is likely that the point 36A will occur between two actual position measurements, and the computer can interpolate between two such position readings to obtain the position of the point 36A, and thus the datum value $d_s$.

If the probe is as shown in FIG. 5, this gives rise to a further possibility for determining the datum value of the point of contact $d_s$. Rather than relying upon the detection of the point 36 or 36A from the capacitance sensor, probes such as shown in U.S. Pat. 4,153,998 contain further sensing means which provide a trigger signal upon contact with the workpiece. This is fed to the machine to trigger the taking of a precision measurement at the instant of contact. For best results, the probe 26A desirably provides the trigger signal in the manner described in European Patent Application EP 243766. Such a trigger signal occurs practically instantaneously upon contact with the workpiece.

If the slope of the curve 34A in the exponential region E is already known (e.g. if the capacitance probe has already been calibrated for this) then the knowledge of the position $d_s$ obtained by one of the above methods provides a datum or reference point for future measurements on the workpiece surface 30. For a future measurement, it is then not necessary to touch the workpiece surface. With the sphere 28 an unknown distance from the workpiece surface, a capacitance measurement is made, and the computer can easily work out a corresponding value of d. Subtracting the datum value $d_s$ gives the spacing from the sphere 28 to the surface 30. This is similar to a conventional datuming operation with a conventional CMM probe.

If the capacitance probe has not previously been calibrated to determine the slope of the curve in the exponential region, all that is required is to store in computer memory the co-ordinates of the points 32 as they are measured during the movement towards the workpiece 30. These are stored in terms of the values d of the spacing of the probe from the workpiece surface. They are stored in a look-up table, each with the corresponding value of the capacitance of the probe as measured. During a subsequent measurement operation, with the sphere 28 an unknown distance from the workpiece surface, the capacitance is measured and a corresponding spacing d is determined from the look-up table. The computer can be programmed to interpolate between adjacent values if desired.

An alternative calibration method is as follows. In this method, the probe is moved towards (or away from) the surface, taking a series of readings of capacitance C against distance as previously. However, in this method it is not necessary to make contact with the workpiece surface. From the series of readings taken, the computer calculates the values of the two constants in an equation which relates the capacitance to the distance moved, using a conventional "best fit" algorithm. The constants are stored in computer memory. During a subsequent measurement operation, with the probe an unknown distance from the surface 30, a capacitance measurement is made. The computer then determines the distance d between the surface and the probe, simply by solving the equation using the pre-stored values of the constants and the measured value of C.

The description above has been in terms of a spherical probe electrode 28, such as might be used for scanning a workpiece contour. However, the invention is useable with many other types of capacitance probe electrodes. For example, it may be used in conjunction with the probes of the type shown in U.S. Pat. 4,814,691, in which a plate is oriented edge-on to a conductive workpiece surface, and measurements are made of the fringe-field capacitance between the plate and the surface in order to determine surface profile (surface roughness) on a microscopic scale; average surface roughness; or for scanning the surface contour or topography on a macroscopic scale.

Alternatively, the electrode arrangements may be as described in our above-referenced concurrently filed International Patent Application Number WO 92/06357 which in one example has two parallel plates edge-on to the workpiece surface and operates by detecting changes in the fringe-field between the two electrodes caused by the presence of the workpiece surface.

It is not essential that the workpiece surface should be conductive, since the capacitance is nevertheless affected measurably by the dielectric properties of a non-conductive workpiece which is in the vicinity of the probe (especially with the probes consisting of two parallel plates).

It should be noted that the constants in the equation are affected not only by the configuration of the probe, but also by the local shape of the workpiece surface (e.g. whether it is convex or concave), and by the dielectric constant of the material of the workpiece if it is not conductive. It is therefore desirable to calibrate the probe in respect of either or both these variables. Thus, in a simple case where the effects of the shape of the workpiece surface are to be ignored, the probe will be calibrated for the dielectric constant of each workpiece material which is to be measured. For each material, there is stored in computer memory a different look-up table of values of C against d, different values of the equation constants.

Figure 6:
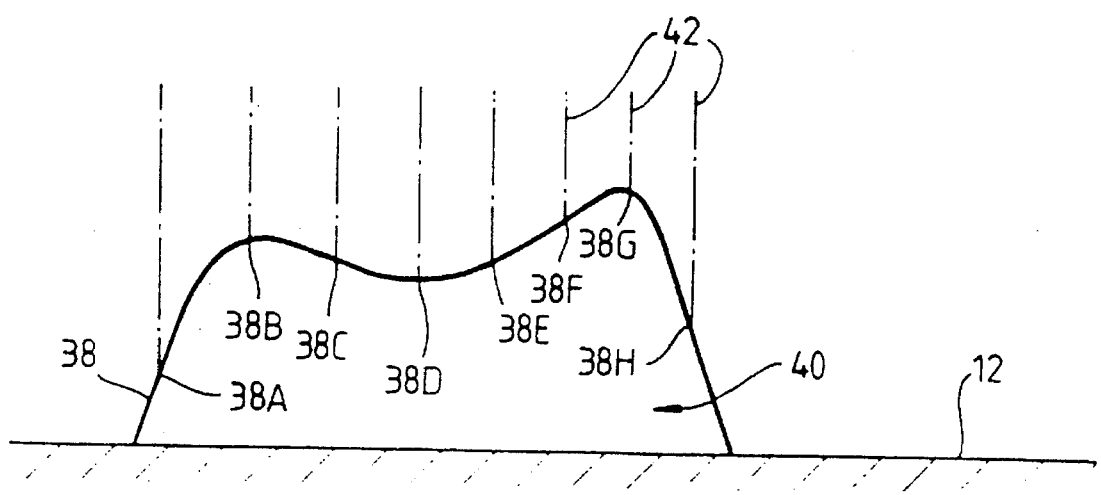
FIG. 6 is a schematic illustration of scanning a workpiece.

FIG. 6 illustrates the situation in which a more rigorous calibration is carried out. This calibration method is especially useful in the common practical situation where a series of nominally identical workpieces 40 are to be inspected, e.g. as they come off a production line. The calibration may be carried out either on one of the workpieces off the production line or alternatively on a master workpiece to which the production workpieces are to be compared. Other workpieces are then measured using the calibration values thus derived.

As shown in FIG. 6, the workpiece 40 has a surface 38 which is to be scanned, to determine whether the surface contour is within tolerance. For production measurements it is desired to scan as rapidly as possible, at a certain stand-off from the surface. Some of the points at which measurements will be taken are denoted 38A–38H in the drawing. At each of these points, on the master workpiece or on one of the production workpieces, a calibration step is performed by moving towards or away from the point to be measured, e.g. along lines 42. While these are shown in the drawing as being vertical, it will be appreciated that they can instead be normal (or approximately normal) to the surface. Calibration is performed in the same way as described above, obtaining a look-up table or a set of constants for use in the equation relating the capacitance to the distance. Such a look-up table or set of constants is obtained for each of the points 38A–38H. It will be appreciated that such calibration automatically takes into account the dielectric constant of the workpiece, if it is non-conductive, as discussed above. Because of the shape of the workpiece surface, different calibration values will be obtained for each of the points. For example, if the surface is locally concave, such as at point 38D, the slope of the curve depicted in FIG. 4 in the exponential region E will be greater than that of the curve 34A for a plane surface, and might be as illustrated by the broken curve 34B. If the local surface is convex, on the other hand, such as shown at 38B or 38G, then the slope of the curve of FIG. 4 will be lower such as illustrated at 34C. Thus, a different look-up table or different set of calibration constants is obtained for each required position on the workpiece surface.

The overall shape of the workpiece 40 is also stored at the time of this calibration measurement, to enable the scanning of subsequent workpieces to take place along a known path which will be approximately at the desired stand-off from the surface 38. During such a scan, capacitance measurements are made at each desired point, and values of the distance d to the surface 38 are calculated in the same manner as described above, using the corresponding look-up table or using the corresponding calibration constants. All such calculations can be performed automatically by the computer. It is also possible for the computer to interpolate when taking measurements between various pre-calibrated points 38A–38H.

The above illustration with respect to FIG. 6 is for use during production measurement of a known surface (i.e. one whose nominal dimensions are known in advance or obtained by the calibration step on a master workpiece or the first workpiece). However, it can also be of use for measuring an unknown surface. This is done in the same way as the above described calibration step, moving towards or away from the workpiece surface at each of a plurality of points. Not only does this give co-ordinate data for the location of the point on the workpiece surface, but also the local shape of the workpiece surface is determined (e.g. whether it is concave or convex) by calculating the slope of the curve shown in FIG. 4, or by utilising the constants $k_1$ and $d_0$ determined from the measurement of that point. Knowing the local shape of the surface is very valuable when measuring an unknown surface, since it enables the computer to predict where the surface will be found at the next point to be probed, speeding up the measurement process considerably.

Thus, a typical measurement operation would involve moving towards the workpiece surface at a first point to be measured; determining the co-ordinates of that point; determining the local shape at that point; calculating from these values a predicted set of co-ordinates for the next adjacent point to be measured; moving towards the predicted point; determining the actual co-ordinates of the point and the local shape; and so on. This procedure can be developed into a very fast scanning method, by moving the probe in the scanning direction generally parallel to the workpiece surface, whilst at the same time superimposing on it an oscillation in the direction normal to the surface. The capacitance is sampled at a higher rate than the frequency of the oscillation, e.g. 10 KHz. Real time calculations are made of the distance to the surface and of the local shape of the surface, and used to control the scanning movement.

Figure 7:
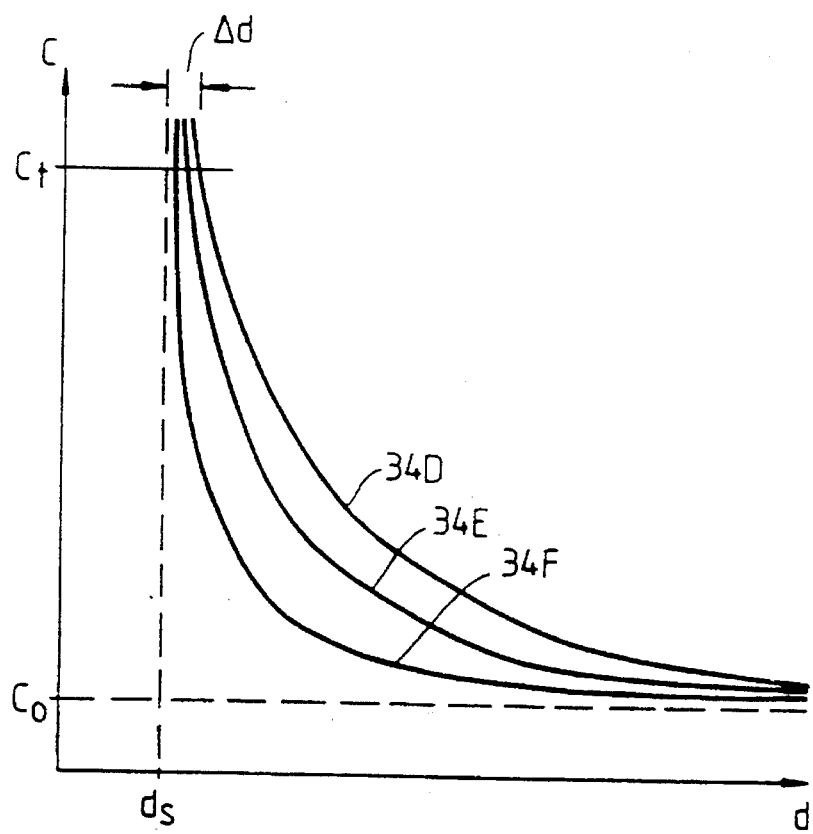
FIG. 7 is a further graph of capacitance against distance.

FIG. 7 is a non-logarithmic graph of the capacitance C against the distance d, which illustrates another method for determining the datum position $d_s$. Curves 34D, 34E, 34F show how the capacitance varies with distance for different local shapes of the surface. As the probe approaches the surface, without touching it, the capacitance increases rapidly towards infinity. A threshold capacitance value $C_t$ is detected by a threshold detector 29 (FIG. 1). The value $C_t$ is chosen such that when the capacitance exceeds this value, the distance d is always within a very small range $\Delta d$ from the value $d_s$, whatever the shape of the surface, the value of $\Delta d$ being negligibly small. The value of $\Delta d$ may be less than 1 μm, as long as ionisation or breakdown of the air gap between the electrode and the workpiece surface does not take place (creating an effective short circuit). In use, the probe is moved towards the workpiece surface, under servo control from the output of the capacitance measuring circuit 27 so that it slows down as it nears the surface and never quite touches it. The output from the threshold detector 29 is treated in the same way as a trigger signal from a touch trigger probe. Indeed, in addition to its uses for determining the datum position $d_s$, this method may be used in place of a touch trigger probe for point-to-point measurements on the workpiece, and is particularly useful in the case of soft materials where conventional touch trigger probes could deform the workpiece surface. This method has, in general, the advantage that no mechanical deflections of the probe are required to sense the surface.

In all the above examples, the calibration values have been determined by performing a calibration step upon the workpiece. However, it is common production practice that, prior to manufacture, workpieces are designed on a computer aided design (CAD) system. In a further example of the invention, the look-up tables or calibration constants to be stored in the computer for each of the positions 38A–38H are obtained not by physical measurements upon a workpiece but rather by calculation by the CAD system. Data concerning the local shape of the surface at each of these surface points is readily available within by the CAD system. From such data it is straightforward for the computer to calculate the slope of the curve of FIG. 4 of the exponential region E, and from it the calibration constants or an appropriate look-up table for the point concerned.

We claim:

1. A method of calibrating a capacitance probe of a position determining machine, said machine determining a displacement of the probe relative an origin of the machine, the probe measuring a capacitance between the probe and a surface, said surface located at an arbitrary and unknown position relative to the probe, the calibration method comprising the steps of:

moving the probe along a line which intersects the surface;

using only the position determining machine to measure actual displacements of the probe relative to the origin of the machine, as the probe is moved;

determining a touch point on the line at which the probe would touch the surface;

determining a probe displacement relative to the origin of the machine if said probe were at said touch point at which the probe would touch the surface; and determining a relationship between measured capacitance between the probe and the surface and distance between the probe and the surface based on the determined probe displacement relative to the origin of the machine if said probe were at said touch point to enable the probe to be used to measure said distance.

2. A method according to claim 1, further comprising the step of monitoring a variation of the capacitance between the probe and the surface as a function of the actual position of the probe relative to the machine.

3. A method according to claim 2, wherein said touch point determining step comprises:

causing the probe to touch the surface; and detecting a discontinuity in said variation of the capacitance at the position at which the probe touches the surface.

4. A method according to claim 3, wherein said discontinuity is detected by an electronic detector circuit.

5. A method according to claim 3, wherein said discontinuity determining step comprises:

recording a plurality of values of the capacitance as the probe is moved along said line; and performing a computer analysis of the recorded values.

6. A method according to claim 1, wherein the probe includes a deflectable stylus for contacting the surface.

7. A method according to claim 6, wherein the probe comprises sensing means for providing a trigger signal upon contact with the surface, said touch point being determined upon an occurrence of said trigger signal.

8. A method according to claim 1, wherein the probe comprises sensing means for providing a trigger signal upon contact with the surface, said touch point being determined upon an occurrence of said trigger signal.

9. A method according to claim 1, wherein said touch point is determined by detecting a threshold value of capacitance as the probe moves towards the surface, corresponding to a negligibly small distance between the probe and the surface.

10. A method according to claim 1, wherein the skewed line is normal to the surface.

11. A method of calibrating a capacitance probe for measuring a distance between the probe and a surface by measuring a capacitance between the probe and the surface, the probe being mounted in a machine for producing relative movement between the probe and the surface, the machine having means for measuring the actual distance moved by the probe, the calibration method comprising:

moving the probe along a line which is skewed to the surface;

recording a plurality of values of the capacitance and the corresponding values of the actual distance moved by the probe along said line at points spaced at unknown distances from the surface; and producing, from the recorded capacitance and distance values, calibration values for use in determining a distance between the probe and the surface from a measured value of capacitance.

12. A method according to claim 11, further comprising the step of calculating values of constants in an equation which relate the capacitance to the distance.

13. A method according to claim 11, wherein the skewed line is normal to the surface.

14. A method of scanning a workpiece surface, comprising passing a capacitance probe over points on the surface in spaced relationship therefrom, measuring a value of a capacitance between the probe and the surface at each point, and determining from the measured values of the capacitance the distances from the probe to the surface, wherein said probe is separately calibrated for each of a plurality of said points.

15. A method according to claim 14, further comprising the step of determining a local shape of the surface at at least one of said points.

16. A method according to claim 15, further comprising the step of predicting another point to be scanned from the determined local shape, and moving the probe in accordance with the prediction.

17. A method according to claim 14, wherein the calibration at each of said plurality of points is performed by moving the probe along a line which is skewed to the surface, and monitoring the variation of a capacitance between the probe and the surface as a function of the actual distance moved along the line.

18. A method according to claim 17, wherein said movement along said line is effected by superimposing on the probe an oscillating relative motion in a direction skewed to the surface, while simultaneously scanning the probe over said points on the surface in a spaced relationship.

19. A method according to claim 17, further comprising the step of determining a datum value for said movement along the line, the datum value corresponding to a position at which the probe would touch the surface.

20. A method according to claim 17, wherein the skewed line is normal to the surface.

21. A method according to claim 14, wherein the calibration at each of said plurality of points is performed by moving the probe along a line which is skewed to the surface, and recording a plurality of capacitance values and corresponding values of the actual distance moved along the line.

22. A method according to claim 21, further comprising the step of calculating from the recorded values the values of constants in an equation which relates the capacitance to the actual distance moved by the probe.

23. A method for calibrating a capacitive probe without using a direct measurement of distance between a surface of the capacitive probe and a surface to be analyzed, comprising:

(a) placing the surface of the capacitive probe at a first point, the first point spaced a first unknown distance from the surface to be analyzed;

(b) measuring a first capacitance between the surface of the capacitive probe and the surface to be analyzed when the surface of the capacitive probe is at the first point;

(c) placing the surface of the capacitive probe at a second point, the first and second points defining a line intersecting the surface to be analyzed at an intersection point, the second point spaced a second unknown distance from the surface to be analyzed and spaced along the line a first known distance from the first point;

(d) measuring a second capacitance between the surface of the capacitive probe and the surface to be analyzed when the surface of the capacitive probe is at the second point; and (e) repeating steps (c) and (d) at at least one additional point, each additional point at an unknown distance from the surface to be analyzed and on the line;

(f) determining, based on at least the measured capacitances and the known distances between the first, second and each additional point, an estimated distance between the surface of the capacitive probe and the surface to be analyzed; and (g) calibrating the capacitive probe based on the measured capacitances and the estimated distance between the surface of the capacitive probe and the surface to be analyzed.

24. The method of claim 23, wherein the second and each additional point is closer to the surface to be analyzed than any previous point.

25. The method of claim 23, wherein the estimated distance between the surface of the capacitive probe and the surface to be analyzed is an estimated distance between one of the first, second and each additional point and the intersection point.

26. The method of claim 23, further comprising:

(h) moving the surface of the capacitive probe to a current additional point closer to the surface to be analyzed than any preceding point, the current additional point being on the line and being a known distance from the first point;

(i) measuring an additional capacitance between the surface of the capacitive probe and the surface to be analyzed when the surface of the capacitive probe is at the current additional point; and (j) updating the estimated distance based on the measured additional capacitance and the known distance corresponding to the current additional point.

27. The method of claim 26, further comprising:

(k) repeating steps (h)–(j) until the estimated distance is zero.

28. The method of claim 23, further comprising:

(h) determining a relationship between measured capacitance between the surface of the capacitive probe and the surface to be analyzed and distance between the surface of the capacitive probe and the surface to be analyzed based on the estimated distance, and the measured capacitances and the measured distances for the first, second and each additional point, to enable the capacitive probe to be used to measure the distance between the surface to the capacitance probe and the surface to be analyzed.

29. The method of claim 23, wherein the capacitive probe is mounted on a position determining machine, and each measured distance is measured using the position determining machine.

30. A method of scanning a surface to be analyzed with a capacitive probe at various points on the surface to be analyzed and for calibrating the capacitive probe at at least one of said points without using a direct measurement of distance between a surface of the capacitive probe and the surface to be analyzed, comprising:

(a) determining a first distance between the capacitive probe and the surface to be analyzed at a first point on the surface to be analyzed;

(b) moving the capacitive probe from the first point across the surface to be analyzed in a first direction and at a first speed, the capacitive probe spaced from the surface to be analyzed;

(c) as the capacitive probe is moved across the surface to be analyzed, moving the capacitive probe in a second direction which is at an angle to the first direction and at a second speed which is greater than the first speed, wherein the probe is alternately moved closer to and farther from the surface to be analyzed;

(d) measuring a capacitance between the surface of the capacitive probe and the surface to be analyzed at a plurality of points around each point as the probe is moved in the first and second directions;

(e) measuring a distance in the second direction from the first point for each of the plurality of points for each at least one of said points; and (f) determining, for each point, based on at least the measured capacitances and the measured distances for the corresponding plurality of points, an estimated distance between the surface of the capacitive probe and the surface to be analyzed; and (g) calibrating the capacitive probe for each point based on the measured capacitances and the estimated distance between the surface of the capacitive probe and the surface to be analyzed.

31. The method of claim 30, further comprising determining a local shape of the surface to be analyzed at at least one of said points.

32. The method of claim 31, further comprising:

predicting another one of the various points to be scanned from the determined local shape, and moving the probe in accordance with the prediction.

33. The method of claim 30, wherein the calibration at each of said various points is performed by moving the probe along a line which is skewed to the surface to be analyzed, and monitoring the variation of a capacitance between the probe and the surface to be analyzed as a function of the actual distance moved along the line.

34. The method of claim 33, wherein said movement along said line is effected by superimposing on the probe an oscillating relative motion in a direction skewed to the surface to be analyzed, while simultaneously scanning the probe over said various points on the surface to be analyzed in a spaced relationship.

35. The method of claim 33, further comprising determining a touch point on the line at which the probe would touch the surface.

36. The method of claim 33, wherein the skewed line is normal to the surface to be analyzed.

37. The method of claim 30, wherein the calibration at each of said various points is performed by moving the probe along a line which is skewed to the surface to be analyzed, and recording a plurality of a capacitance values and corresponding values of the actual distance moved along the line.

38. The method of claim 37, further comprising calculating from the recorded values the values of constants in an equation which relates the capacitance to the actual distance moved by the probe.

* * * * *